May 24, 1932.　　O. N. GREDELL　　1,859,666
DUMP BODY
Filed Sept. 14, 1928　　5 Sheets-Sheet 5
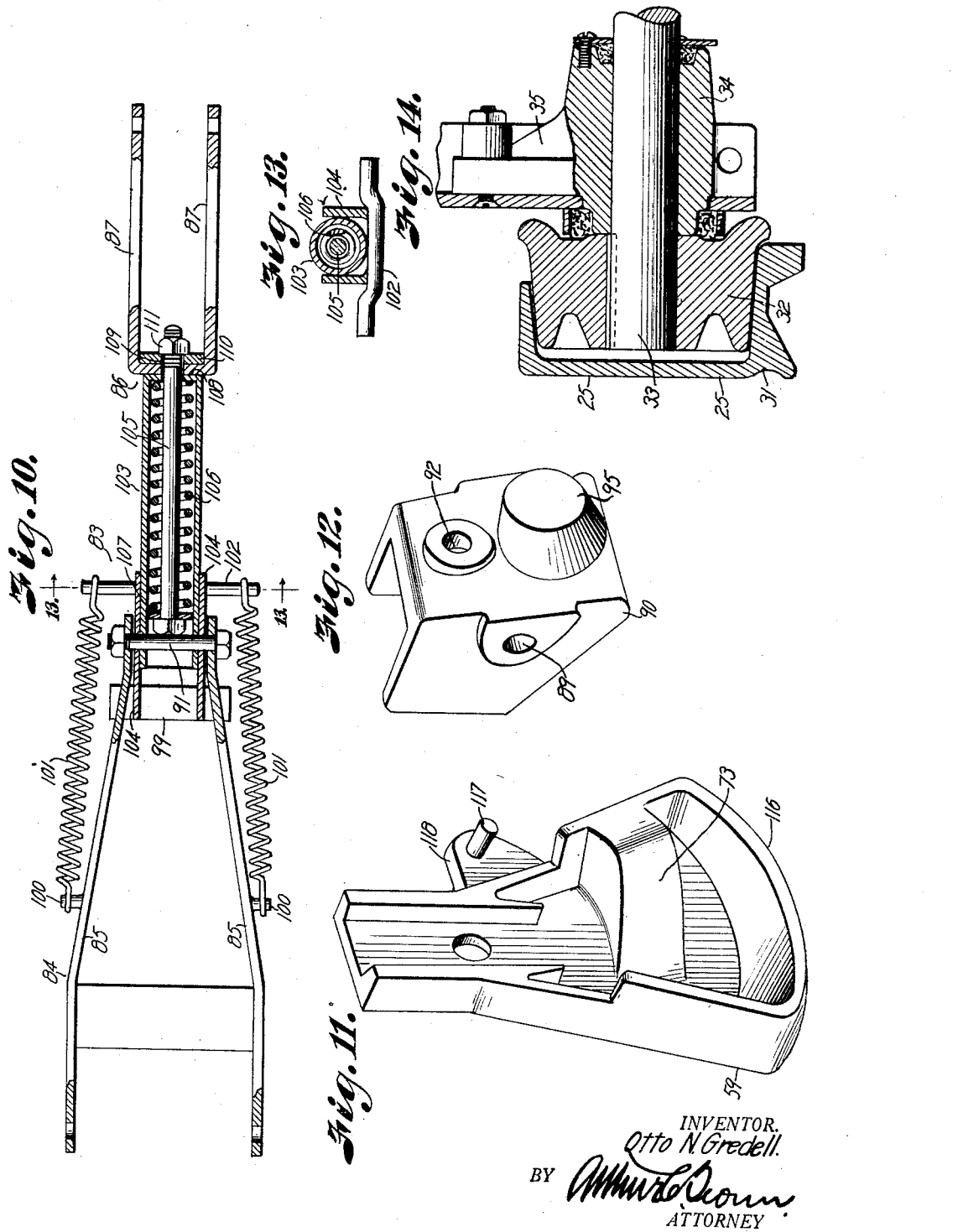
INVENTOR.
Otto N. Gredell.
BY
ATTORNEY Patented May 24, 1932

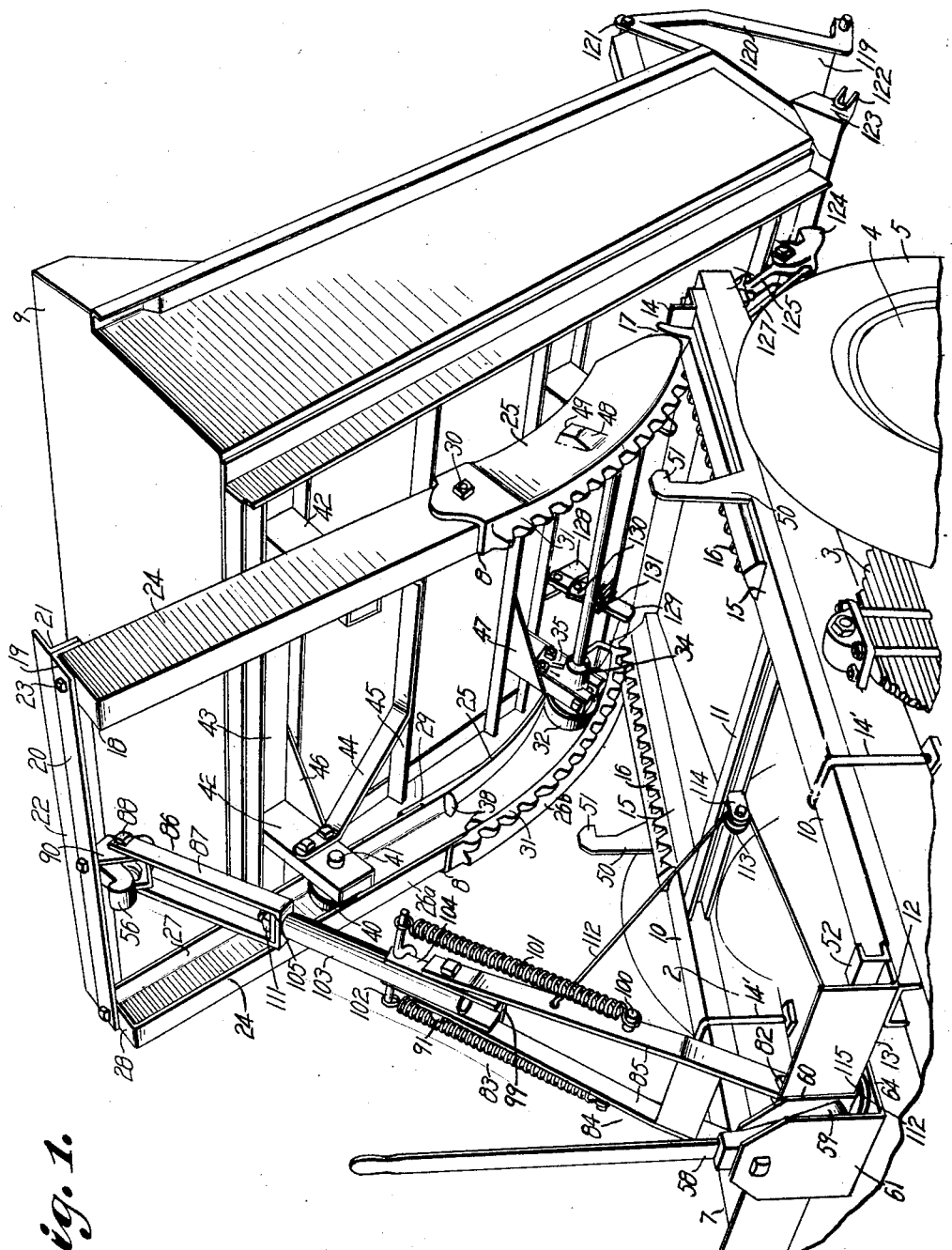

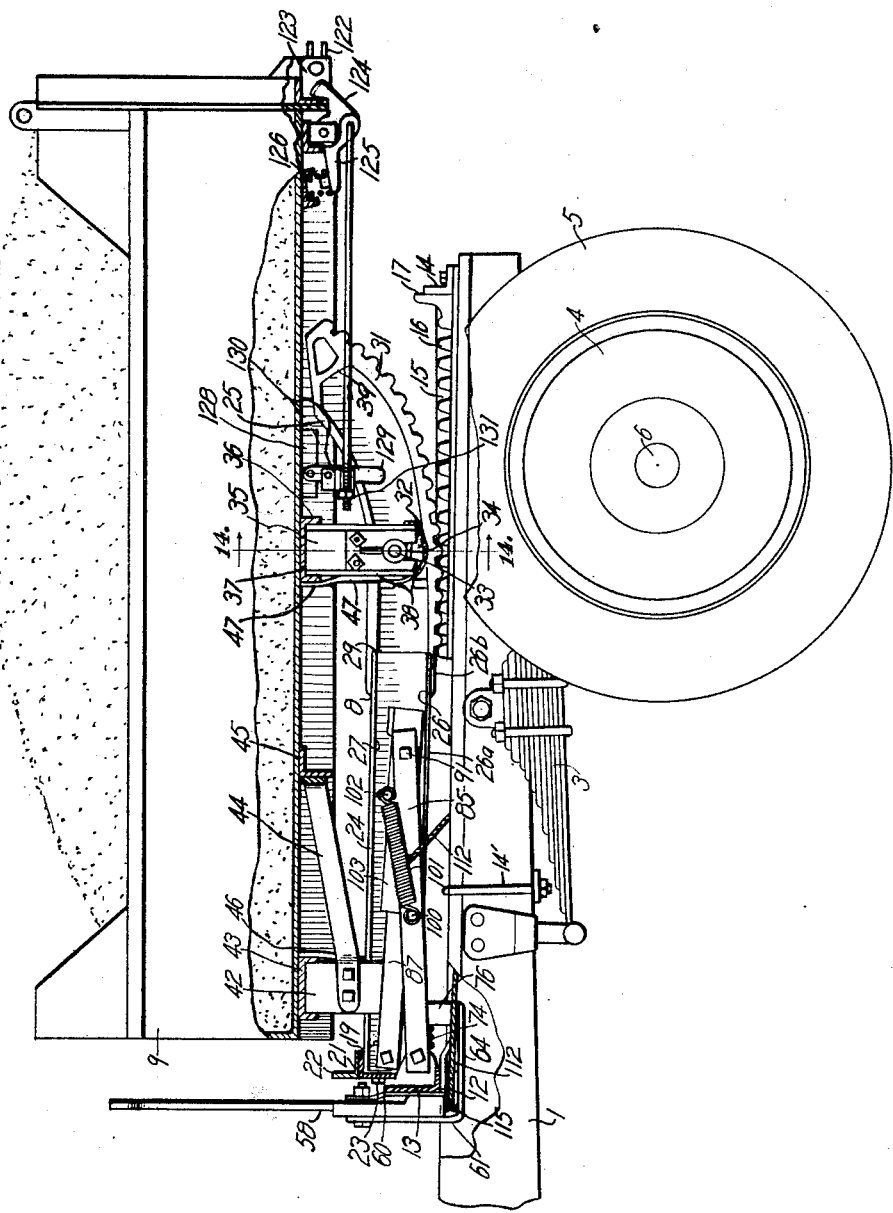

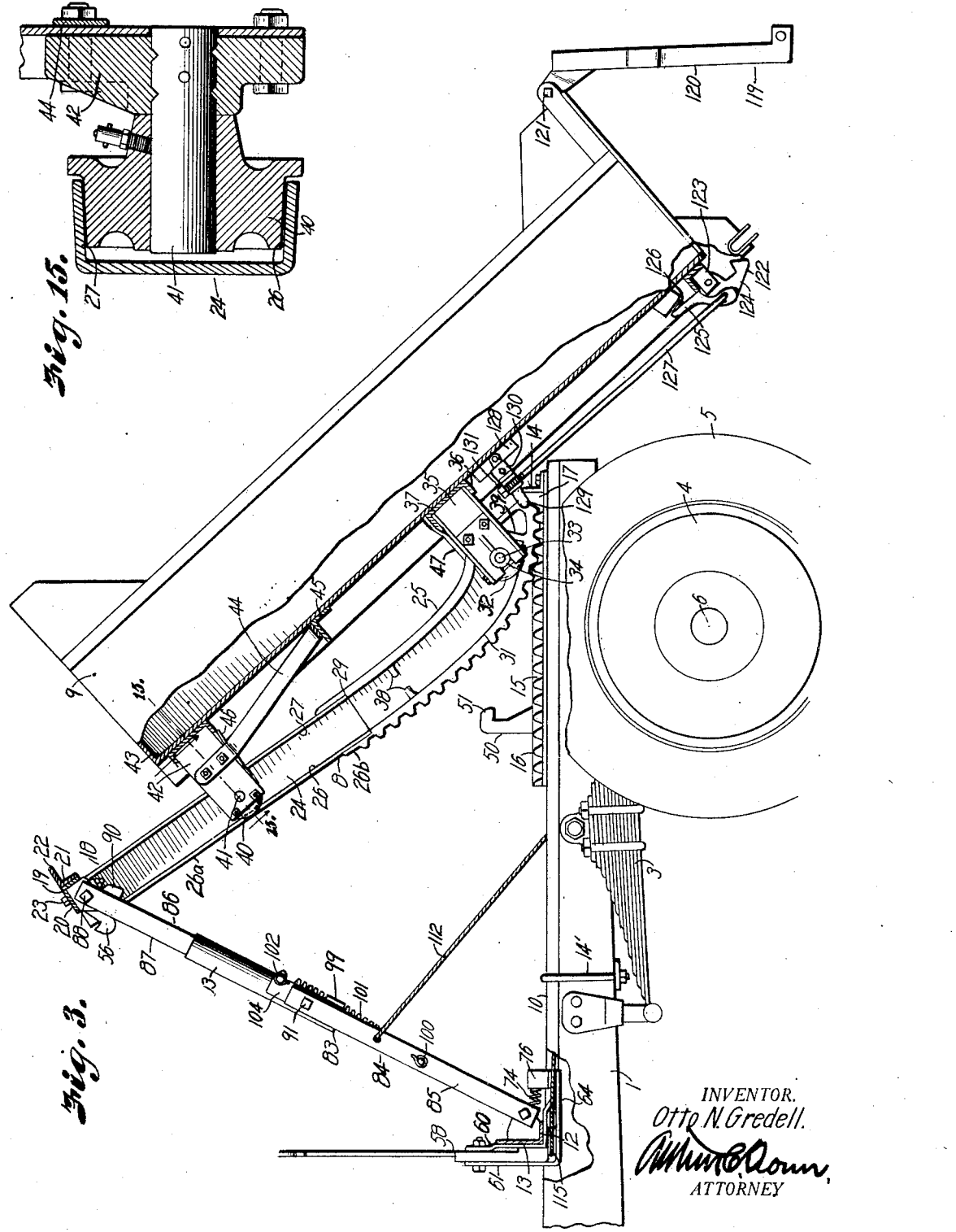

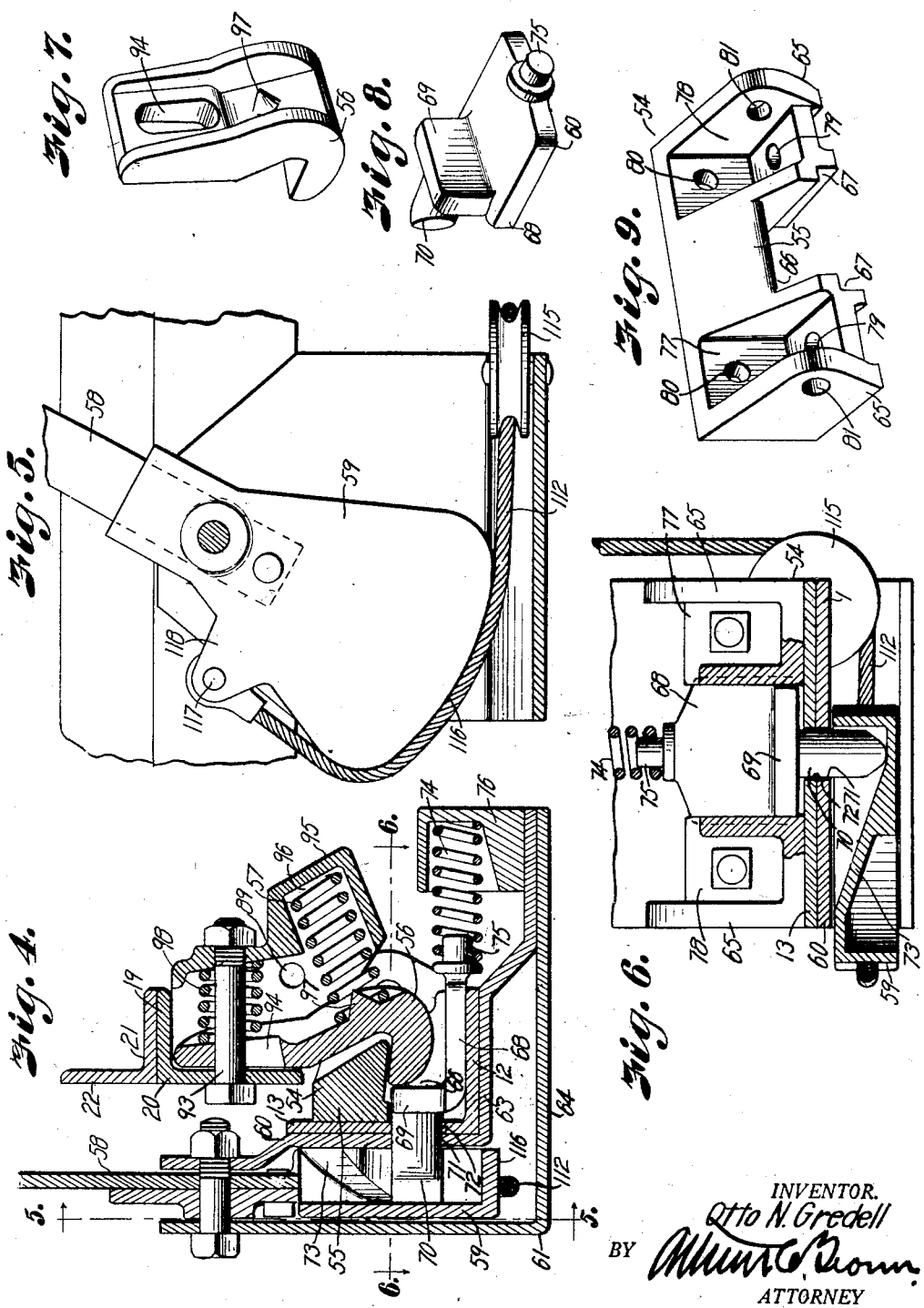

1,859,666

UNITED STATES PATENT OFFICE

OTTO N. GREDELL, OF KANSAS CITY, MISSOURI, ASSIGNOR TO STANDARD STEEL WORKS, OF NORTH KANSAS CITY, MISSOURI, A CORPORATION OF MISSOURI

DUMP BODY

Application filed September 14, 1928. Serial No. 306,040.

My invention relates to trucks and more particularly to dump bodies and means for tiltably supporting the bodies from a truck chassis, the principal objects of the invention being to support a loaded body with its center of gravity substantially forward of the rear axle of the chassis, to cause the body to move rearwardly while rocking into dumping position, and to cause dumping of materials into substantially spaced relation with the rear wheels of the chassis, whereby the load will be more equally distributed to the chassis and undue wear on the rear tires and severe strain on the rear springs will be obviated, a dump body may be mounted on a relatively long chassis, and the dumped material may be discharged into a receiver without moving the truck wheels into engagement with the receiver.

Among the further objects of my invention are the following:

To operate the apparatus from a single lever for dumping or for returning the body to carrying position.

To automatically latch the body in retracted position.

To include an upwardly lifting effect on the front end of a rocker unit coincidentally with the rearward movement of rollers for moving the body into dumping position.

To facilitate the return of the body to carrying position after the load is discharged, and to assure the uniform movement of body-moving rollers.

Further objects will be disclosed in the course of the description of the invention and in connection with disclosure of means for operating the body-supporting and tilting members.

In accomplishing these and other objects of the invention, I have provided improved details of structure, the preferred forms of which are illustrated in the accompanying drawings, wherein:

Fig. 1 is a perspective view of a dump body, means for supporting and operating the dump body, and a portion of a truck chassis on which the supporting means may be mounted, the apparatus being illustrated in dumping position.

Fig. 2 is a side elevation of the device and a portion of the supporting chassis partly in section and partly broken away for better disclosure and illustrating the body in carrying position.

Fig. 3 is a similar view illustrating the body in dumping or unloading position.

Fig. 4 is an enlarged detail vertical sectional view of portions of the device including latching members for locking the body in carrying position and an operating lever for releasing the latch.

Fig. 5 is a vertical sectional view on the line 5—5, Fig. 4 illustrating cable means connected with the lever for retracting a body supporting arm for return of the body to carrying position.

Fig. 6 is a horizontal sectional view on the line 6—6, Fig. 4, illustrating a spring urged bolt and a cam on the lever adapted to move the bolt for shifting the hook from latch engaging position.

Fig. 7 is a detail perspective view of the latch hook.

Fig. 8 is a detail perspective view of the bolt illustrated in Figs. 4 and 6 movable by the lever cam to release the latch.

Fig. 9 is a detail perspective view of the bolt guide and hook latch illustrated in Figs. 4 and 6.

Fig. 10 is a plan view partly in longitudinal section of a hinged arm for supporting the front end of the body in dumping position.

Fig. 11 is an enlarged detail perspective view of the lower end of the operating lever.

Fig. 12 is an enlarged detail perspective view of a yoke for pivotally supporting the latching hook and the upper end of the hinged arm from the body.

Fig. 13 is a cross section on the line 13—13, Fig. 10.

Fig. 14 is an enlarged sectional view on the line 14—14, Fig. 2 illustrating a main roller keyed to a rotating shaft and a shaft supporting bracket.

Fig. 15 is a sectional view on the line 15—15, Fig. 3 illustrating an idling roller rotatable on a stub shaft fixed in a supporting bracket.

Referring in detail to the drawings:

1 and 2 designate longitudinal frame members of a motor truck chassis, 3 one of the rear springs, 4 the rear wheels having relatively large tires 5, and 6 the rear axle.

My device comprises three main elements, namely a frame 7 adapted for support on the chassis, a rocking support 8 mounted on the frame 7 and a dump body 9 adapted for longitudinal movement on the support 8 and for tilting into and out of dumping position, all of which will be particularly described.

The frame 7 comprises parallel, preferably channel-like members 10 adapted for mounting on the respective chassis members 1 and 2, an intermediate cross bar 11, an angle 12 secured to the front end of the frame 7 and having a relatively wide vertical flange 13 and an angle 14 connecting the rear ends of the channels. The frame members 10 are suitably secured to the chassis, for example by U bolts 14'. Horizontal gear tracks 15 having gear teeth 16 extending inwardly and upwardly are mounted on the rear ends of the channels and extend forwardly to points in front of the rear axle position. The gear tracks are provided with stop lugs 17 on their rear ends which abut the angle 14.

The rocking support 8 comprises similar channel-like rocking arms or rockers 18 connected at their forward ends by an angle 19 having a flange 20 engaging the vertical ends of the rockers, and an angle 21 having an upwardly extending flange 22, the angles being attached to the rockers by suitable fastening means such as bolts 23. Each rocker further comprises preferably two channel-like members 24 and 25 connected end to end so that their lower flanges 26a and 26b are aligned to constitute a roller track 26 extending laterally and inwardly of the rocker and frame, and their aligned upper flanges constitute a keeper track 27, for purposes presently described.

The member 24 is a straight channel having an end wall 28 for attachment of the flange 20 of the end angle 19, and the member 25 is a relatively heavy arcuate channel recessed at its forward end to form a socket 29 to receive the rear end of the front member 24 to which it is connected by a bolt 30. Toothed flanges 31 on the lower edges of the members 25 comprise rack segments adapted to mesh with the gear tracks and restrain the rockers from longitudinal movement while being tilted on the frame as later described.

The body is supported from the rockers for movement therealong by center or main rollers 32 mounted in the rocker members 25 to roll on the lower flange tracks, and keyed to a shaft 33 rotatably mounted in bearings 34 comprising portions of brackets 35 secured to flanges 36 of channel-like cross bars 37 attached to the body preferably adjacent the longitudinal center of the body. The rollers are limited in their movement in the members 25 by forward paired spaced lugs 38 which serve as chucks to receive the rollers, and rear ribs 39 extending across the members from one flange to the other. The rollers are stopped by the lugs 38, but may roll freely away from them.

The body is further supported by idling rollers 40 moving in the front rocker members 24 and rotatably mounted on stub shafts 41 fixed in brackets 42 secured to the lower surface of the body as by channels 43, the detail construction of the main and idling rollers and their mounting being illustrated in Figs. 14 and 15. The idling roller supporting brackets are preferably reinforced and braced by straps 44 attached to the brackets and secured to cross angles 45 attached to the body, and reinforcing plates 46 attached to the brackets and secured to the body by suitable means. Similar reinforcing plates 47 brace the brackets 35 of the main rollers 32.

The rollers are adapted to support the body from the rockers for movement longitudinally therealong into and out of dumping position coincidentally with the tilting of the rockers on the frame as will be particularly described.

Bosses 48 are provided on the outer faces of the rocker members 25 having tapered upper faces 49 for engagement by latching hooks 51 of arms 50 extending upwardly from the frame members 10, the rearwardly extending hooks 51 of the arms receiving the bosses when the rockers are moved downwardly and forwardly from tilted position to latch the body in retracted position.

Mounted on the front ends of the members 10 and having elevation substantially equal to that of the gear tracks, are blocks 52 adapted to support the front ends of the rockers whereby the rocking support will extend substantially parallel with the frame when the body is in carrying position.

The body in carrying position and supporting a load of material indicated by 53, has its center of gravity forward of the rear axle, the rollers 32 being engaged by the lugs 38 forwardly of the rear axle to prevent forward movement, in which situation the idling rollers lie adjacent the front ends of the rocker members 24.

Supported adjacent the horizontal center of the front cross angle 12 is a bracket 54, Figs. 4, 6 and 9, including a latch web 55 having a horizontal bottom surface and a beveled top. A hook 56 pivotally supported from the angle 19 of the rocker structure, the head of the hook being urged outwardly by a spring 57, is adapted for latching with the web 55 when the rockers are retracted to carrying position as will be more particularly described.

The hook is adapted for displacement from the web by a lever 58 having a flat head 59 pivotally supported in parallel relation with and on the front side of the vertical flange 13 of the front cross angle by plates 60 and 61 parallel with said flange and spaced to receive the lever head, the inner plate 60 being secured to the flange preferably by bolts and right-angularly rearwardly extending portions 63 and 64 of the plates passing under the angle 12 and converging at their rear ends where they are jointed for supporting the plate 61 from the plate 60.

The bracket 54 further comprises spaced arms 65 between which the web 55 extends elevated above the bottoms of the arms to form a recess 66 for admitting the hook 56 into web engaging position. Right-angular grooves 67 are formed in the lower edges of the opposing faces of the bracket arms to provide a guide for a plate-like bar 68 which slides on the horizontal angle of the cross member 12 and has a vertical flange or lug 69 movable back and forth under the web of the bracket in the area occupied by the head of the latching hook in latching position.

A horizontal plunger 70 extends forwardly from the flange through openings 71 and 72 in the vertical flange 13 and plate 60 respectively, and normally engages the inner face of the lever head and is movable rearwardly of the frame by a cam 73 on the lever head face to displace the latching hook. The plate 68 is urged toward retracted position by a spring 74 mounted on a boss 75 on the rear end of the plate and anchored in a post 76 supported from the rear end of the plate 60.

The bracket 54 is provided with suitable recesses 77 and 78 for accommodating the heads of fastening means and with openings 79 and 80 whereby fastening means may be extended through the bracket, and the vertical and horizontal members of the cross angle 12 to secure the bracket to the cross angle. The bracket is further provided with openings 81 to receive bolts 82 whereby the branches of the lower arm member are pivotally connected to the frame.

It is apparent that release of the hook from the web will permit the rockers to tilt away from carrying position. The rocker movement is yieldingly restrained and limited by a hinged or foldable arm 83 comprising a lower member 84 including spaced branches 85 pivotally supported on said bolts 82 of the bracket, and an upper member 86 including branches 87 pivotally mounted on a bolt 88 extending in openings 89 of a yoke-like socket member 90 secured to the inner side of the flange 20 of the front cross angle 19 on the forward ends of the rocker, the arm members 84 and 86 being hingedly connected by a bolt 91.

The socket 90, Fig. 12, also comprises the means for mounting the latching hook 56 on the rockers, having an opening 92 for a hook supporting bolt 93 extending in a slot 94 of the hook and through the angle flange 20, the bolt thus attaching the socket to the angle for pivotally supporting both the arm member and the hook. The yoke further has a boss 95 providing for a recess 96 for seating the spring 57 bearing against the back of the hook head for urging the hook into latching engagement with the web, a boss 97 retaining the spring in engagement with the hook. The stem of the hook extends across the flange 20 and a coil spring 98 mounted on the bolt 93 retains the hook stem yieldingly on the flange end of the bolt, the slot permitting the hook to swing into and out of the web engaging position.

The pivotal movement of the arm members on the bolt 91 is limited by a plate 99 mounted on the upper member and adapted to engage the upper end of the lower member after the members have passed aligned position.

Extending laterally in central positions on the lower branches of the foldable arm are pins 100 comprising anchores for the lower ends of coil springs 101, the upper ends of which are secured to opposite ends of a bar 102 mounted on the upper arm member, the springs being adapted for tensioning when the arm is unfolded, to latch the same in extended positons and tending to urge the arm member into folded position after the hinge has been broken.

The upper member 86 of the foldable arm further includes a cylinder 103, plates 104, secured to the cylinder and extending below the lower end thereof and to which the bar 102 is attached, the hinge pin 91 extending through the plates and the cylinder to hinge the upper arm to the branches of the lower arm member. A plunger 105 is reciprocable in the cylinder, and a coil spring 106 is mounted on the plunger and bears oppositely against a guide washer 107 and an inner flange 108 in the upper end of the cylinder, the plunger extending in an opening 109 of the web 110 connecting the branches 87 of the upper arm member and being retained in engagement with the branches by a nut 111. The structure thus renders the foldable arm extensible and the spring serves as a shock-absorber for taking up the shock incident to the tilting of the rockers into dumping position.

Attached to the lower member 84 of the foldable arm mid-way of its length, is a cable 112 running on a pulley 113 supported on a bracket 114 secured to the cross member 11 of the frame, the cable extending forwardly at the side of the horizontal spaced plate portions and over a horizontal pulley 115 mounted between said spaced portions. The cable then passes over a flange 116 comprising the arcuate periphery of the lever head to a pin 117 mounted on an ear 118, projecting from the head adjacent its pivotal mounting, so that when the lever is pivoted, the cable will be drawn in to break the arm and retract it into folded position or will be released to permit the arm to be unfolded.

An end gate 119 is provided with rearwardly extending arms 120 at its upper edge pivotally mounted on a rod 121 supported by the body. Latching pawls 122 are pivotally supported from brackets 123 secured to the body adjacent the rear end thereof, and have rearwardly extending gate-engaging hooks 124 and forwardly extending arms 125 against which expansion springs 126 bear to urge the pawls into gate-engaging position.

Rods 127 extending forwardly beneath the body are pivotally connected with the pawls, and are automatically operable as presently described to withdraw the pawls from gate-engaging position.

Pivotally supported from plates 128 depending from the body adjacent the threaded front ends of the rods 127 are short swinging bars 129, and pivoted on these bars are swinging slotted brackets 130 through which the front ends of the rods extend. Nuts 131 are fixed to the front faces of the swinging brackets 130 in registry with the slots thereof, and the projecting ends of the rods are movably mounted in the nuts, whereby the effective length of the rods may be varied for adjusting the relation of the pawls to the end gate.

The short bars 129 project downwardly from the body sufficiently to engage the angle 14 which connects the channels at the rear end of the frame, when the rockers are tilted and the roller-supported body moves rearwardly thereover toward dumping position.

The bars are rocked upon engaging the angle, and pull on the rods, through the swinging brackets, for pivoting the pawls to release the end gate and permit the material to move the end gate and flow from the body.

When the body tilts and moves forwardly toward carrying position, the end gate swings by gravity and its lower edge encounters the pawl hooks and pivots the pawls, the springs urging the pawls into gate-engaging position to latch the gate in closed position.

The length of the rods may be adjusted to accommodate the pawl hooks to varying positions of the lower edge of the gate, for example to take up play due to wear.

In using the device, it is apparent that the body is supported by the longitudinally spaced pairs of rollers well forward on the chassis so that much of the weight of the load is distributed to the front axle and wheels, and the center of gravity is a substantial distance in front of the rear axle. The center of gravity is however very slightly behind the axis of the rear pair of rollers, so that the body tends to tip, and is latched in horizontal or carrying position by the hook pivotally supported by the front cross bar on the rocking element which is engaged with the web of the bracket attached to the front cross member of the frame.

When the truck is backed up to a location in which the load is to be dumped, the lever is operated to displace the latching hook, the sliding plate being provided with the hook-engaging flange and lever-engaging stud to facilitate the operation of the lever head cam on the hook.

Release of the hook permits the body-supporting rockers to tilt and rock on the gear racks, the body traveling rearwardly on the rockers, and the upward pressure of the front pair of rollers on the upper flanges of the rockers tending to lift the front ends of the rockers and accelerate the dumping motion. The rear pair of rollers being keyed to the supporting shaft rotate in unison and therefore cause the body to move in a path exactly parallel with the rockers, thus avoiding frictional resistance due to rubbing of the sides of the rollers against the rockers to guide the body.

The rolling support of the body from the rockers provides for a relatively long path of travel whereby the frame may be mounted on a relatively long chassis and the body will move to the rear end of the chassis with a substantial portion of its rear end overhanging the rear end of the chassis frame, and the load will be dumped a desirable distance rearwardly of the wheels.

The dumping motion or tilting is assured by the features above mentioned, but undue strains are prevented by the springs connected with the two hinged members of the folding standard, which are tensioned as the arm unfolds. These springs operate longitudinally of the arm to latch the arm members in substantially aligned position to retain the rockers and body in dumping position, the arm members being stopped in hinged movement slightly beyond aligned relation by the plate 99.

The tilting of the rockers and body is limited by the folding standard, and the shock incident to stoppage of the tilting movement is absorbed by the spring and plunger included in the telescoping elements of the upper arm member.

The travel of the body longitudinally of the rockers is limited by the forward and rearward ribs 38 and 39, which may have resilient characteristics to lessen the shock of engagement of the rear pair of rollers therewith.

The load while being dumped obviously retains the body in dumping position. When the body is empty the center of gravity of the tilted body and rockers is forward of the axis of the rear pair of rollers, and the body tends to tilt toward carrying position but is retained in dumping position by the folding standard or arm. Operation of the lever in the opposite direction to that for releasing the latch hook causes the cable to draw the lower member of the folding arm downwardly, thereby breaking the arm and causing the members to fold, the folding motion being facilitated by the tensioned springs and tending to draw the front ends of the rockers downwardly.

As the rockers tilt toward carrying position, their curved rear ends are elevated, and the rear rollers move by gravity downwardly and forwardly over the flanges of the rockers, thus moving the body forwardly over the chassis toward carrying position.

The members are automatically latched in carrying position as soon as such position is reached, by the spring-urged hook on the front cross bar of the rocker structure which slides over the beveled top of the web of the bracket into engagement with said web, the spring offering sufficient resistance to cause the hook to check the downward movement of the rockers and absorb the shock.

The hook is easily released by pivoting the lever in one direction and attention is called to the fact that the same lever is pivoted in the opposite direction both to condition the rockers and the body supporting rollers for returning the body to carrying position and to impart an initial impulse to the body returning elements. It is apparent further that the resilient characteristics of the forward and rearward roller stopping elements which are tensioned when the body reaches extreme forward or rearward position, may also impart an initial impulse to the moving element upon release respectively of the latch hook 56 and the folding arm.

What I claim and desire to secure by Letters Patent is:

1. In a device of the character described including a frame, a dump body, body rocking means including a rocker having toothed engagement with the frame, and inwardly directed flanges, means for supporting the body from the flanges of the rocker including longitudinally spaced pairs of brackets secured to the body, a shaft journaled in the rear pair of brackets, rollers fixed to said shaft and mounted on the flanges, stub shafts fixed in the forward brackets, and rollers rotatable on said stub shafts and adapted to roll on said flanges.

2. In a device of the character described including spaced parallel frame members, racks in said members having upwardly outwardly inclined inner faces and inwardly upwardly extending teeth on said faces, and a rocker comprising parallel bars having curved lower edges provided with teeth projecting therefrom for meshing engagement with said racks.

3. In a device of the character described, a frame, curved rockers rockable on the frame, a curved track associated with the rockers, a body member, a pair of main rollers operable on said curved track and carried by the body member for fulcruming the body on said rockers whereby the body tends to pivot on said rockers, a second pair of rollers carried by the body and operable on the rockers to move the rockers upon fulcruming movement of the body.

4. In a device of the character described, a fixed frame, a body member, a pivotal frame supported by the fixed frame, means for mounting the body member for rolling support on the pivotal frame, and means associated with the pivotal frame for effecting rolling movement of the body member including means for effecting shifting of said pivotal mounting means through a path parallel with said fixed frame.

5. In a device of the character described, a fixed frame, a body member, a pivotal frame supported by the fixed frame, means for mounting the body member for shifting movement on the pivotal frame, and means associated with the pivotal frame for effecting shifting of said mounting means through a path parallel with said fixed frame upon pivotal movement of the body without shifting the point of pivot with relation to the body.

6. In a device of the character described, a fixed frame, a body member, means for pivotally mounting the body member with relation to the frame, rockers rockable on the frame, means on the body for actuating the rockers upon pivotal movement of the body, and means on the rockers for engaging said pivotal mounting means and said rocker actuating means to effect shifting of said pivotal mounting means in a path parallel with said frame.

7. In a device of the character described, a fixed frame, a body member, a pair of rollers on the body member for pivotally mounting the body member with relation to the frame, rockers on the frame, a second pair of rollers on the body member and engaging the rockers to actuate the rockers upon pivoting of the body member and tracks formed on said rockers to guide the first named pair of rollers in a path parallel with the fixed frame during movement of the rockers.

8. In a device of the character described, a fixed frame, a body member shiftably supported with relation to the frame, a pair of rollers on the body member forming a rolling fulcrum for said body member, a second pair of rollers spaced from the first pair of rollers, rockers on the frame, movable upon shifting of the body member on its fulcrum, tracks formed on the rockers having straight portions guiding the second pair of rollers and having curved portions for the first pair of rollers to control shifting movement of the body.

9. In a device of the character described, a fixed frame, a frame rockable on the fixed frame, a body member carried by said frames, rollers on the body member arranged to normally tilt the body into dumping position and to rock the rockable frame, a track on the rockable frame for guiding said rollers to permit shifting of the body longitudinally with relation to the fixed frame upon rocking movement of the rockable frame, and means formed in said track for affecting rate of shifting movement of the body.

10. In a device of the character described, a fixed frame, a frame rockable on the fixed frame, a body member carried by said frames, rollers on the body member arranged to normally tilt the body into dumping position and to rock the rockable frame, a track on the rockable frame for guiding said rollers to permit shifting of the body longitudinally with relation to the fixed frame upon rocking movement of the rockable frame, and a curved portion formed in said track for affecting rate of shifting movement of the body.

11. In a device of the character described, a fixed frame, a movable frame including side members having upwardly curved forward ends, tracks formed in the side members and following the curvature of said curved ends, gear teeth on curved ends of the side members, rack teeth on the fixed frame meshing with the gear teeth on the side members, a body member tiltable to rock the movable frame at its curved ends, wheels on the body member operable in said tracks to shift the body member upon actuation of the movable frame, and means associated with the curved portion of said tracks to check movement of the wheels.

12. In a device of the character described, a fixed frame, a movable frame supported on the fixed frame including side members having upwardly curved forward ends forming rockers, tracks formed in said side members and following the curvature of said curved ends, a body member, a rolling fulcrum for the body member movable in the curved portions of the tracks, and roller supports for the body operable on the ends of the tracks opposite to said curved portions to effect tilting of the movable frame on said rockers upon movement of the body on its fulcrum and to effect rolling movement of the body of the movable frame.

In testimony whereof I affix my signature.

OTTO N. GREDELL.